(12) United States Patent
Hasenkopf

(10) Patent No.: US 10,211,648 B2
(45) Date of Patent: Feb. 19, 2019

(54) METHOD AND CIRCUIT ARRANGEMENT FOR ACTIVELY BALANCING CELLS OF AN ELECTRIC ENERGY STORE

(71) Applicant: Robert Bosch GmbH, Stuttgart (DE)

(72) Inventor: Dirk Hasenkopf, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 20 days.

(21) Appl. No.: 15/520,884

(22) PCT Filed: Sep. 28, 2015

(86) PCT No.: PCT/EP2015/072219
§ 371 (c)(1),
(2) Date: Apr. 21, 2017

(87) PCT Pub. No.: WO2016/066347
PCT Pub. Date: May 6, 2016

(65) Prior Publication Data
US 2017/0338672 A1    Nov. 23, 2017

(30) Foreign Application Priority Data

Oct. 27, 2014   (DE) .......................... 10 2014 221 867

(51) Int. Cl.
*H02J 7/14*   (2006.01)
*H02J 7/16*   (2006.01)
*H02J 7/00*   (2006.01)

(52) U.S. Cl.
CPC .......... *H02J 7/0019* (2013.01); *H02J 7/0016* (2013.01); *H02J 7/0024* (2013.01); *H02J 2007/0095* (2013.01)

(58) Field of Classification Search
CPC .................................................... H02J 7/0019
(Continued)

(56) References Cited

U.S. PATENT DOCUMENTS

2008/0116850 A1   5/2008 Konishi et al.
2009/0278496 A1  11/2009 Nakao et al.
(Continued)

FOREIGN PATENT DOCUMENTS

EP   2385605   11/2011
EP   2400622   12/2011
(Continued)

OTHER PUBLICATIONS

International Search Report for Application No. PCT/EP2015/072219 dated Nov. 9, 2015 (English Translation, 3 pages).
(Continued)

*Primary Examiner* — Edward Tso
*Assistant Examiner* — Ahmed H Omar
(74) *Attorney, Agent, or Firm* — Michael Best & Friedrich LLP

(57) ABSTRACT

The invention relates to an arrangement (10) for balancing the battery cells (11) of a battery string, in particular the battery cells (11) of a battery module which has a plurality of serially connected battery cells (11). The arrangement (10) has an inductor (9) for storing electric energy and switching devices (17) on the supply side for connecting the poles of a first battery cell (11) to the inductor (9) via a first connection point (13) and a second connection point (14). The arrangement can be actuated by a controller such that electric energy can be transmitted from at least one first battery cell (11) to the inductor (9) and from the inductor (9) to at least one second battery cell (11). According to the invention, the arrangement (10) has a third connection point (15) and a fourth connection point (16) in order to balance the charge and two switching devices (17) on the transfer side, wherein the inductor (9) is connected to the third connection point (15) and the fourth connection point (16) via the two switching devices (17) on the transfer side.

11 Claims, 2 Drawing Sheets

(58) Field of Classification Search
USPC .......................................................... 320/116
See application file for complete search history.

(56) References Cited

U.S. PATENT DOCUMENTS

| | | |
|---|---|---|
| 2012/0194134 A1 | 8/2012 | Kain |
| 2012/0212182 A1 | 8/2012 | Li |
| 2013/0020982 A1 | 1/2013 | Mercer et al. |
| 2014/0239877 A1 | 8/2014 | Chang et al. |
| 2014/0239878 A1* | 8/2014 | Yun ...................... H02J 7/0019 320/103 |

FOREIGN PATENT DOCUMENTS

| | | |
|---|---|---|
| EP | 2592714 | 5/2013 |
| JP | 2013198306 | 9/2013 |

OTHER PUBLICATIONS

Lukasiewycz, M. et al., "Verification of balancing architectures for modular batteries," 2014 International Conference on Hardware/Software Codesign and System Synthesis (CODES+ISSS), ACM, Oct. 12, 2014, pp. 1-10, XP032695321.

Abeywardana, D.B. et al.,"Improved shared transformer cell balancing of Li-ion batteries," Industrial and Information Systems (ICUS), 2012 7th IEEE International Conference on, IEEE, Aug. 6, 2012, pp. 1-6, XP032237820.

* cited by examiner

METHOD AND CIRCUIT ARRANGEMENT FOR ACTIVELY BALANCING CELLS OF AN ELECTRIC ENERGY STORE

BACKGROUND OF THE INVENTION

The invention relates to an arrangement and a method for active cell-balancing of an electrical energy storage device that comprises multiple storage cells.

There is a growing need for energy storage systems that can be used in numerous ways both in stationary and also in mobile applications. Relevant examples thereof are inter alia emergency electrical current systems or electric/hybrid vehicles.

The electrical energy storage device comprises for example multiple storage elements that are embodied as rechargeable batteries and comprise storage cells that are embodied as battery cells. The individual battery cells of the batteries are connected in series and/or in parallel in order to obtain performance and/or energy data that are adjusted to suit the respective application.

In so doing, in the case of individual battery cells, differences with respect to the electrical characteristics (for example voltage, capacity and internal impedance) are observed inter alia on the basis of production fluctuations. In one battery, the individual battery cells are therefore generally not identical with respect to their aging state and their electrical performance.

Generally, in the case of battery cells that are connected in series in the battery, the discharging procedure is terminated as soon as one of the battery cells has achieved their discharging voltage limit. This also applies for the charging procedure of the battery. The charging procedure stops as soon as the charging voltage limit of one of the battery cells is achieved. The cell that has the smallest capacity and is often also referred to as the weakest cell is therefore the first cell to become completely charged or discharged. Consequently, the battery or the battery module is always only as good as the weakest cell of said battery or said battery module.

In order to be able to provide a battery having uniformly loadable cells and furthermore in order also to prevent that the individual battery cells additionally age differently as a result of different voltage states, methods are known for so-called cell-balancing, said methods having the goal of balancing the voltages of the individual battery cells.

If the voltage and the charge is not balanced in such a manner, the charge state of the different cells drifts during operation as a result of slightly different capacities and slightly different self-discharges of the cells or modules.

With respect to the methods for cell-balancing, active cell-balancing differs from passive cell-balancing, wherein, in the case of active cell-balancing using a battery management system, charge balancing between the storage modules is performed in such a manner that the energy of the cells that are too highly charged and that comprise the highest cell voltage is distributed to cells that have a too low charge and have a low cell voltage. In the case of a passive cell-balancing, those cells that have the highest battery voltage are discharged in a purposeful manner until all cells achieve the identical voltage. The discharging procedure is generally performed using resistors, wherein the electrical energy that is to be discharged is converted into heat.

EP 2400622 describes inductive cell-balancing between the cells of an energy storage device, wherein the energy storage device has an inductor by way of which it is possible using an arrangement of switches and diodes to exchange energy between the cells.

EP 2385605 describes an active charge balancing circuit. The charge balancing circuit comprises an inductive storage element and a circuit arrangement that can connect the inductive storage element in response to a control signal to a multiplicity of cell connections so as to perform the charge balancing.

US 2012/0194134 describes a method for charge balancing in a charge storage device arrangement that comprises a multiplicity of charge storage cells that are connected in series, and a charge balancing circuit. Moreover, an inductive charge balancing circuit is described that is configured so as to draw energy from a storage cell and to feed this energy selectively back into a storage cell or the entire charge storage device arrangement.

SUMMARY OF THE INVENTION

In accordance with the invention, an arrangement is provided for balancing the battery cells of a battery string, in particular of battery cells of a battery module that comprises a plurality of series-connected battery cells. In accordance with the invention, a battery cell arrangement is furthermore provided that comprises a battery cell and an embodiment of the inventive arrangement that is connected thereto so as to balance the battery cells of a battery string, and a battery string controller for controlling switching devices of one embodiment of this battery string.

In accordance with the invention, a method is provided in addition for balancing battery cells of one embodiment of a battery string of this type having am embodiment of a battery string controller of this type.

It is provided in accordance with the invention that the arrangement for balancing the battery cells of a battery string, in particular of the battery cells of a battery module, which comprises a plurality of series-connected battery cells, comprises an inductor so as to store electrical energy, wherein said arrangement comprises feed-side switching devices so as to connect the poles of a first battery cell by way of a first connection point and a second connection point to the inductor, wherein said arrangement can be controlled by a control device in such a manner that electrical energy can be transferred from an at least one battery cell into the inductor and from the inductor to at least one second battery cell and said arrangement comprises a third connection point and a fourth connection point for charge balancing and two transfer-side switching devices, wherein the inductor is connected by way of the two transfer-side circuit arrangements to the third and fourth connection point.

Owing to its structure, an arrangement of this type can be controlled in a simple manner and can be constructed from a few components. Said arrangement can be operated in two directions, in other words in a bi-directional manner, so that it is possible to transfer charge both on the feed-side from the battery cell and on the transfer-side into a network that can be connected to the third and fourth connection point and also conversely, a charge can be transferred from a network that can be connected in this manner or from a charge or energy source by way of the connection points to the battery cell. In so doing, in the second case, the transfer-side connection points, in other words the third and the fourth connection point are used for supplying energy and the first and the second connection point are used for transferring the charge to the battery cell.

In an advantageous manner, the switching devices of the arrangement comprise in each case a switch that is embodied as a semi-conductor component, in particular as a diode, thyristor, bi-polar transistor, MOSFET and IGBT. Components of this type are not subject to mechanical wear, can be produced in a cost-effective manner and can be controlled at a high frequency. However, they have a maximum cut-off voltage up to which they can be operated. This limitation is to be taken into consideration when connecting the transfer-side connection points.

In an advantageous manner, the arrangement is embodied in such a manner that it is embodied so as to connect the third connection point to the highest potential and so as to connect the fourth connection point to the lowest potential of the battery string, and the inductor can be connected by way of the transfer-side switching devices in two polarities or flux directions to the highest and the lowest potential. One embodiment of this type offers the advantage that it is embodied for operation at the voltage of the battery string and that by way of example a charge that is provided by the battery string can be used so as to transfer the charge in a purposeful manner into the battery cell that is arranged on the feed-side so that by way of example all battery cells of a battery string can be used so as to support the weakest battery cell of the battery string.

If a battery string has a very high voltage that would require the use of very expensive semi-conductor components, then said battery string can be divided in an advantageous manner into multiple series-connected sections, in particular into modules. One section of a battery string that is divided into modules likewise represents a battery string in the sense of this invention.

Since the arrangement is embodied for a bi-directional operation, the switching devices can be operated for currents in two flow directions. In an advantageous manner, the switching device comprises a parallel connection of a switch and a diode. A switching device of this type considerably reduces the complexity of the control device that is required for operating the arrangement since the switching device for producing a conducting state requires only one control signal for a flow direction that is opposite to the cut-off direction of the diode. Furthermore, an embodiment of this type offers greater freedom when embodying the switch as a semi-conductor switch since it is only necessary to embody said switch for one flow direction. In an advantageous manner, the switching device comprises a MOSFET or an IGBT as a switch. These components offer the advantage that they comprise an integrated diode parallel to the transistor switch that is provided by said components.

In an advantageous manner, the second feed-side connection point can be connected to the highest potential of the battery string so as to connect to the negative pole of the first battery cell by way of a series connection that comprises two diodes that are arranged in the cut-off direction, the first feed-side connection point can be connected to the lowest potential of the battery string so as to connect to the positive pole of the first battery cell by way of a series connection that comprises two diodes that are arranged in the cut-off direction, and the inductor is arranged between the respective two diodes that are arranged in series. An embodiment of this type offers the advantage that the arrangement in accordance with the invention can be implemented with a few components, in other words with four switches, four diodes and an inductor.

A battery cell arrangement is provided in accordance with the invention, wherein the battery cell arrangement comprises a battery cell and an inventive arrangement that is connected thereto for balancing the battery cells of a battery string. A battery cell arrangement of this type offers the advantage that it comprises a battery cell, the poles of which can be connected directly to the poles of further battery cells so as to produce a series connection or a battery string, and said battery cell arrangement simultaneously comprises connections in the form of the third and fourth connection point to a charge balancing arrangement by way of which the battery cell can be purposefully charged or discharged irrespective of the positioning of the battery cell arrangement in a series connection, in other words irrespective of its potential position within a battery string.

In one advantageous embodiment of the invention, a battery cell arrangement comprises a battery cell and an arrangement that is structurally integrated therewith and connected thereto for balancing the battery cell. It is possible to produce a modular unit in this manner.

Moreover, a battery string having a plurality of battery cell arrangements of this type is provided in accordance with the invention, wherein the arrangement for each battery cell arrangement is embodied in a structurally similar manner, in particular in an identical manner, and the battery cells of the battery cell arrangement are connected in series to form a string. A structurally similar, in particular identical embodiment of the battery cell arrangement of a battery string renders it possible to rationalize the manufacturing process and the modularization of the battery cell arrangements.

In an advantageous manner, the third connection points of the arrangements are connected to the highest potential and the fourth connection points are connected to the lowest potential of the battery string, wherein electrical energy can be transmitted between the battery cells by means of a balancing current that can be received and discharged by an inductor. An embodiment of this type renders it possible to transmit a charge of one battery cell in a purposeful manner to the battery cells of the entire battery string, or conversely, to transmit the charge of the entire battery string to an individual battery cell.

Furthermore, a battery string controller is provided in accordance with the invention for controlling the switching devices in a battery string in accordance with the invention, wherein the battery string controller is embodied so as to control the switching devices in such a manner that the balancing current can be received by the inductor from the battery cell that is connected thereto in a battery cell arrangement or of at least one battery cell that is adjacent to this battery cell so that it is possible to adjust the direction in which the balancing current is flowing through an at least second battery cell.

In an advantageous manner, the inductor that is allocated to one battery cell can be supplied on the feed-side not only from the battery cell that is allocated thereto but it can also be supplied from an adjacent or rather a series connection of adjacent battery cells that are arranged in the battery string below or above the battery cell to which the inductor is allocated. If a battery string comprises by way of example a series connection of a plurality of battery cell arrangements i, j, k, l of which the battery cell arrangement i is connected to the highest potential and the battery cell arrangement l is connected to the lowest potential of the battery string, then by way of example the inductor of the battery cell arrangement j can be supplied in the case of an inventive controller of the switching devices also by means of the series connection of the battery cells of the battery cell arrangements k and l or by means of the battery cell of the battery cell arrangements i. It is possible in this example to use for this purpose the second and further connection point or the first and third connection point of the arrangement j.

Such a procedure of controlling the arrangements or the switching devices of the battery string renders it possible for different inductors of the battery string to supply a different number of series-connected battery cell arrangements. In dependence upon the number of battery cells being supplied and consequently in dependence upon the magnitude of the voltage on the input-side, it is possible to produce a balancing current of a different magnitude in the inductor.

In an advantageous manner, the magnitude of a predeterminable balancing current can be controlled by means of the battery string controller, wherein the number of battery cells being supplied can be adjusted so as to control the balancing current. Such an embodiment of the battery string controller renders it possible to control the speed of a charge transfer. It is also rendered possible, by means of appropriately selecting the magnitude of the inductance that is used for forming the balancing current, to adjust the number of the battery cells being supplied.

It is possible by means of switching devices in conjunction with the battery string controller to control the direction of a balancing current that can be received and then discharged by the inductor of the arrangement. The direction of the balancing current that is flowing through the inductor is described as a positive balancing current and occurs if the inductor is connected on the feed-side to a battery cell that is allocated to said inductor and its first connection point is connected to the positive pole of the associated battery cell and its second connection point is connected to the negative pole of the battery cell. A balancing current that is flowing in the opposite direction is described as a negative balancing current.

A method is provided in accordance with the invention for balancing battery cells of one embodiment of such a battery string having an embodiment of a battery string controller in accordance with the invention wherein the direction of the balancing current is adjusted in each battery cell arrangement in such a manner that:

a positive balancing current occurs if energy is to be drawn from the first battery cell and is to be supplied to the battery string;

a negative balancing current occurs if energy is to be drawn from the battery string and is to be supplied to the first battery cell;

A method of this type renders it possible to distribute in a purposeful manner charge from an individual battery cell to all battery cells of a battery cell string and from a battery cell string to an individual battery cell.

BRIEF DESCRIPTION OF THE DRAWINGS

The invention is further explained hereinunder with reference to the attached drawings and with the aid of preferred embodiments.

In the drawings.

DETAILED DESCRIPTION

Figure 1:
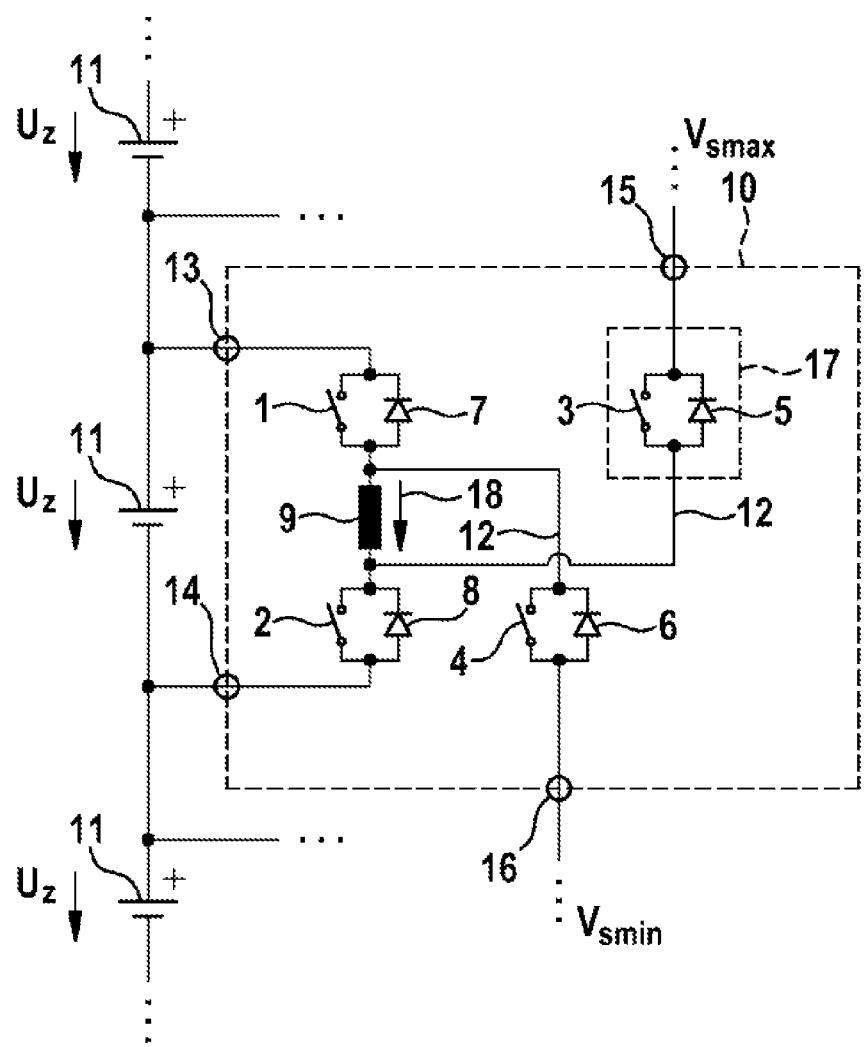
FIG. 1 illustrates an example of an arrangement in accordance with the invention for balancing the battery cells of a battery string.

FIG. 1 illustrates a referred exemplary embodiment of an arrangement 10 in accordance with the invention for balancing the battery cells 11 of a battery string.

FIG. 1 also illustrates an arrangement 10 for balancing the battery cells 11 of a battery string having a plurality of series-connected battery cells 11. The arrangement 10 comprises an inductor 9 for storing electrical energy. Furthermore, the arrangement 10 comprises on the feed-side switching devices 17 so as to connect the poles of a first battery cell 11 by way of a first connection point 13 and a second connection point 14 to the inductor 9. The switching devices 17 can be controlled by a control device, not illustrated in the figure, in such a manner that electrical energy can be transmitted from at least one battery cell 11 into the inductor 9 and from the inductor 9 to at least a second battery cell 11. Furthermore, the arrangement 10 comprises a third connection point 15 and a fourth connection point 16 for charge balancing and two transfer-side switching devices 17. The inductor 9 is connected to the third connection point 15 and the fourth connection point 16 by way of the two transfer-side switching devices 17.

As a result of the switching device 17 having sufficient dielectric strength, the arrangement 10 is suitable for being connected by way of the third connection point 15 to the highest potential $V_{smax}$ of the battery string and the fourth connection point 16 to the lowest potential $V_{smin}$ of the battery string. In so doing, the inductor 9 can be connected by way of the transfer-side switching devices 17 in two polarities or flow directions 18 to the highest and the lowest potential of the battery string for charge balancing using a balancing current. A balancing current that is flowing through the inductor 9 in the illustrated flow direction 18 is described as a positive balancing current.

The switching devices 17 comprise in each case a parallel connection of a switch 1, 2, 3, 4 and a diode 5, 6, 7, 8. Moreover, so as to connect the arrangement 10 to the negative pole of the first battery cell 11, the second feed-side connection point 14 can be connected to the highest potential $V_{smax}$ of the battery string by way of a series connection 12 that comprises two diodes 5, 8 that are arranged in the cut-off direction, and, so as to connect the arrangement 10 to the positive pole of the first battery cell 11, the first feed-side connection point 13 can be connected to the lowest potential $V_{smin}$ of the battery string by way of a series connection 12 that comprises two diodes 6, 7 that are arranged in the cut-off direction. The inductor 9 is arranged between the respective two diodes 5 and 8 or 6 and 7 that are arranged in series, in other words the inductor 9 is connected by one of its connections to the series connection 12 of the diodes 5 and 8 and by the other connection to the series connection 12 of the diodes 6 and 7.

Figure 2:
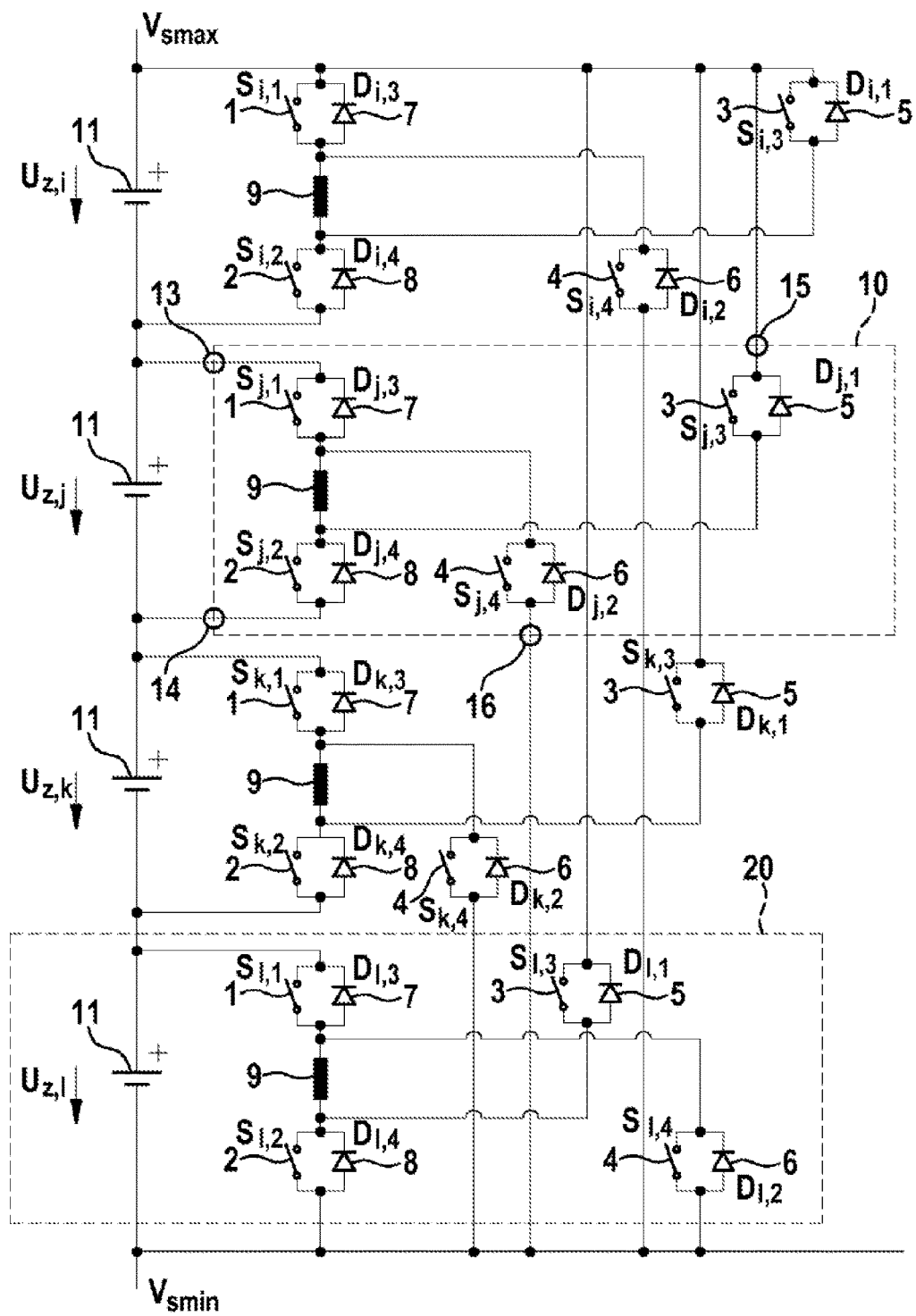
FIG. 2 illustrates an example of a battery string in accordance with the invention having a plurality of battery cells with a respective inventive arrangement that is allocated to said battery cells and is for balancing the battery cells.

FIG. 2 illustrates four battery cell arrangements 20, wherein each battery cell 11 comprises an arrangement 10 that is connected to it. In order to assist further differentiation, the four battery cell arrangements 20 are provided with the indices i, j, k and l. The battery cells 11 of the battery cell arrangements 20 are connected in series to form a string and form a battery string, wherein each battery cell arrangement 20 is embodied in a structurally similar, in particular identical, manner.

Furthermore, the third connection points 15 of the arrangements 10 are connected to the highest potential $V_{smax}$ and the fourth connection points 16 are connected to the lowest potential of the battery string $V_{smin}$ so that electrical energy can be transmitted between the battery cells 11 by means of a balancing current that can be received and discharged by an inductor 9.

The switching devices 17 in the arrangements 10 are to be controlled in such a manner that the balancing current can be received by the inductor 9 from the battery cell 11, which is connected in a battery cell arrangement 20 to said inductor, or from at least one battery cell 11 that is adjacent to this battery cell 11 so that it is possible to adjust the direction of the balancing current that is flowing through an at least second battery cell 11.

Some of the control options for the switching devices 17 are described hereinunder. This is achieved using the example of the battery cell arrangement 20 with the index j.

In a first control position, the switches 1,j and 2,j of the battery cell arrangement 20 are closed. Subsequently, a positive balancing current in the flow direction 18 occurs in the inductor 9, said balancing current being supplied from the battery cell 11,j. Once the switches 1,j and 2,j have opened, the balancing current that is stored in the inductor 9 flows by way of the diode 5,j through the battery cells 11 i,j,k and l and the diode 6,j back to the inductor 9. A charge from the battery cell 11,j is distributed to all battery cells 11, i,j,k,l of the battery string.

In a second control option, the switches 3,j and 4,j of the battery cell arrangement 20 are closed. Subsequently, a negative balancing current in the flow direction 18 occurs in the inductor 9, said balancing current being supplied from the battery cells 11,i,j,k,l. Once the switches 3,j and 4,j have opened, the balancing current that is stored in the inductor 9 flows by way of the diode 7,j through the battery cells 11,i and the diode 8,j back to the inductor 9. A charge from all battery cells 11, i,j,k,l of the battery string is distributed to the battery cell 11,j.

In a third control option, the switches 2,j and 4,j of the battery cell arrangement 20 are closed. Subsequently, a negative balancing current in the flow direction 18 occurs in the inductor 9, said balancing current being supplied from the battery cells 11,k,l. Once the switches 3,j and 4,j have opened, the balancing current that is stored in the inductor 9 flows by way of the diode 7,j through the battery cells 11,i and the diode 8,j back to the inductor 9. A charge from all battery cells 11,k,l of the battery string is distributed to the battery cell 11,j.

In a fourth control option, the switches 1,j and 3,j of the battery cell arrangement 20 are closed. Subsequently, a positive balancing current in the flow direction 18 occurs in the inductor 9, said balancing current being supplied from the battery cell 11,i. Once the switches 1,j and 3,j have opened, the balancing current that is stored in the inductor 9 flows by way of the diode 5,j through the battery cells 11,i,j,k,l and the diode 6,j back to the inductor 9. A charge from a battery cell 11,j is distributed to all battery cells 11, i,j,k,l of the battery string.

A fifth control option is described with reference to the battery cell arrangement 20 having the index 1.

In a fifth control option, the switches 1,l and 3,l of the battery cell arrangement 20 are closed. Subsequently, a positive balancing current in the flow direction 18 occurs in the inductor 9, said balancing current being supplied from the battery cell 11,i,j,k. Once the switches 1,l and 3,l have opened, the balancing current that is stored in the inductor 9 is distributed by way of the diode 5,l through the battery cells 11,i,j,k,l and the diode 6,l back to the inductor 9. A charge from three battery cells 11,i,j,k is distributed to all battery cells 11, i,j,k,l of the battery string.

It is evident from the previously described control options that it is possible by means of appropriately controlling the switching devices 17 to adjust the number of battery cells 11 being supplied and thus the magnitude of a balancing current by means of the battery string controller. Consequently, it is possible to control both the magnitude and the direction of the balancing current. In particular, it is possible in accordance with the first control option to form a positive balancing current, wherein energy is drawn from a first battery cell 11 and supplied to the battery string, and using the second control option to form a negative balancing current, wherein energy is drawn from the battery string and supplied to a second battery cell 11.

The invention claimed is:

1. An arrangement (10) for balancing the battery cells (11) of a battery string, the arrangement (10) comprising:
   an inductor (9) for storing electrical energy,
   feed-side switching devices (17) connecting the poles of a first battery cell (11) by way of a first connection point (13) and a second connection point (14) to the inductor (9), and
   a control device configured to control electrical energy transmitted from an at least one battery cell (11) into the inductor (9) and from the inductor (9) to at least a second battery cell (11),
   a third connection point (15),
   a fourth connection point (16), and
   two transfer-side switching devices (17),
   wherein the inductor (9) is connected by way of the two transfer-side switching devices (17) to the third connection point (15) and the fourth connection point (16) for charge balancing; and
   wherein a switching device (17) comprises a parallel connection of a switch (1), (2), (3), (4) and a diode (5), (6), (7), (8).

2. The arrangement (10) as claimed in claim 1, characterized in that the third connection point (15) is connected to the highest potential and the fourth connection point (16) is connected to the lowest potential of the battery string, and the inductor (9) is connected by way of the transfer-side switching devices (17) in two polarities or flow directions (18) to the highest and the lowest potential of the battery string.

3. The arrangement (10) as claimed in claim 1, characterized in that the second feed-side connection point (14) is connected to the highest potential of the battery string connecting to the negative pole of the first battery cell (11) by way of a series connection (12) that comprises two diodes (5), (6), (7), (8) arranged in a cut-off direction, the first feed-side connection point (13) is connected to the lowest potential of the battery string connecting to the positive pole of the first battery cell (11) by way of a series connection (12) that comprises two diodes (5), (6), (7), (8) arranged in a cut-off direction, and the inductor (9) is arranged between the respective two diodes (5), (6), (7), (8) that are arranged in series.

4. A battery cell arrangement (20) characterized in that the battery cell arrangement (20) comprises a battery cell (11) and an arrangement (10) as claimed in claim 1, said arrangement connected to said battery cell.

5. A battery string having a plurality of battery cell arrangements (20) as claimed in claim 4, characterized in that the arrangement (10) is structurally similar for each battery cell arrangement (20), and the battery cells (11) of the battery cell arrangement (20) are connected in series to form a string.

6. The battery string as claimed in claim 5, characterized in that the third connection points (15) of the arrangements (10) are connected to the highest potential and the fourth connection points (16) are connected to the lowest potential of the battery string, wherein electrical energy transmitted between the battery cells (11) by a balancing current is received and discharged by an inductor (9).

7. A battery string controller for controlling the switching devices (17) in a battery string as claimed in claim 5, characterized in that the battery string controller is configured to control the switching devices (17) such that the balancing current is received by the inductor (9) from the battery cell (11) that is connected in a battery cell arrangement (20) to said inductor or from at least one second battery cell (11) that is adjacent to the battery cell (11) enabling adjustment of the direction of the balancing current that is flowing through the at least second battery cell (11).

8. The battery string controller as claimed in claim 7, characterized in that the magnitude of a predeterminable balancing current is controlled by the battery string controller, wherein the number of battery cells (11) being supplied is adjusted so as to control the balancing current.

9. A method for balancing battery cells (11) of a battery string having a battery string controller as claimed in claim 7, wherein the direction of the balancing current in each battery cell arrangement (20) is adjusted in such a manner that:
- a positive balancing current occurs if energy is to be drawn from the first battery cell (11) and is to be supplied to the battery string;
- a negative balancing current occurs if energy is to be drawn from the battery string and is to be supplied to the first battery cell (11).

10. The arrangement (10) as claimed in claim 1, wherein the battery cells (11) are part of a battery module including a plurality of series connected battery cells (11).

11. A battery string having a plurality of battery cell arrangements (20) as claimed in claim 5, wherein the arrangement (10) is structurally identical.

* * * * *